(12) United States Patent
Morris et al.

(10) Patent No.: US 7,222,307 B2
(45) Date of Patent: May 22, 2007

(54) MULTIPURPOSE NAVIGATION KEYS FOR AN ELECTRONIC IMAGING DEVICE

(75) Inventors: Robert P. Morris, Raleigh, NC (US); Stephen G. Sullivan, Mountain View, CA (US)

(73) Assignee: Scenera Technologies, LLC, Portsmouth, NH (US)

( * ) Notice: Subject to any disclaimer, the term of this patent is extended or adjusted under 35 U.S.C. 154(b) by 309 days.

(21) Appl. No.: 10/869,733

(22) Filed: Jun. 16, 2004

(65) Prior Publication Data

US 2005/0283729 A1    Dec. 22, 2005

(51) Int. Cl.
G06F 3/023 (2006.01)
G06F 3/048 (2006.01)
G06F 3/02 (2006.01)

(52) U.S. Cl. .................... 715/827; 715/773; 715/810

(58) Field of Classification Search ............. 715/864, 715/702, 827, 773, 810
See application file for complete search history.

(56) References Cited

U.S. PATENT DOCUMENTS

| | | | |
|---|---|---|---|
| 4,456,931 A | 6/1984 | Toyoda et al. ............ 358/335 |
| 4,937,676 A | 6/1990 | Finelli et al. ............ 358/229 |
| 4,982,291 A | 1/1991 | Kurahashi et al. ......... 358/335 |
| 5,021,989 A | 6/1991 | Fujisawa et al. .......... 364/900 |
| 5,138,460 A | 8/1992 | Egawa ...................... 358/224 |
| 5,237,648 A | 8/1993 | Mills et al. ............. 395/133 |
| 5,274,458 A | 12/1993 | Kondo et al. ............ 358/209 |
| 5,465,133 A | 11/1995 | Aoki et al. ............. 354/442 |
| 5,497,193 A | 3/1996 | Mitsuhashi et al. ....... 348/231 |
| 5,513,306 A | 4/1996 | Mills et al. ............. 395/148 |
| 5,559,943 A | 9/1996 | Cyr et al. |
| 5,608,491 A | 3/1997 | Sasagaki et al. ......... 396/243 |
| 5,635,984 A | 6/1997 | Lee |
| 5,682,207 A | 10/1997 | Takeda et al. ........... 348/568 |
| 5,742,339 A | 4/1998 | Wakui .................... 348/233 |
| 5,781,175 A | 7/1998 | Hara ..................... 345/127 |
| 5,796,428 A | 8/1998 | Matsumoto et al. ....... 340/231 |
| 5,845,166 A | 12/1998 | Fellegara et al. ......... 396/64 |
| 5,861,918 A | 1/1999 | Anderson et al. ......... 348/233 |
| 5,943,043 A | 8/1999 | Furuhata et al. |
| 5,977,976 A | 11/1999 | Maeda .................... 345/353 |
| 6,097,431 A | 8/2000 | Anderson et al. ......... 348/233 |
| 6,122,003 A | 9/2000 | Anderson ................ 348/207 |
| 6,160,926 A * | 12/2000 | Dow et al. .............. 382/313 |
| 6,995,875 B2 * | 2/2006 | Dow et al. .............. 358/473 |
| 2005/0009571 A1 * | 1/2005 | Chiam et al. ............ 455/566 |

FOREIGN PATENT DOCUMENTS

| | | |
|---|---|---|
| JP | 832847 | 2/1996 |
| JP | 8116476 | 7/1996 |
| JP | 8205014 | 9/1996 |
| JP | 8223524 | 11/1998 |

* cited by examiner

Primary Examiner—Raymond J. Bayerl
Assistant Examiner—Namitha Pillai

(57) ABSTRACT

A method and apparatus for a portable electronic imaging device, comprising a display screen for displaying objects including any combination of digital still images, video clips, menu items, and icons; and a navigation controller comprising navigation keys for allowing a user to navigate between the displayed objects, wherein the user may select a currently displayed object without moving a finger from a navigation key last pressed, thereby implementing navigation and select functions on a single controller.

10 Claims, 3 Drawing Sheets

MULTIPURPOSE NAVIGATION KEYS FOR AN ELECTRONIC IMAGING DEVICE

FIELD OF THE INVENTION

The present invention relates generally to portable electronic imaging devices, including digital cameras and cell phones, and more particularly to a method and apparatus for implementing navigation and select functions using a multipurpose navigation key.

BACKGROUND OF THE INVENTION

Portable electronic imaging devices capable of displaying digital images and video are commonplace today. Examples of such devices include digital cameras, camera-enabled cell phones, MP3 players, and personal digital assistants (PDAs), for instance. FIGS. 1A and 1B are diagrams illustrating example portions of the hardware interface included on conventional imaging devices.

Referring to FIG. 1A, a conventional imaging device 10 is equipped with a liquid-crystal display (LCD) or other type of display screen 12 for displaying objects 14. Objects that may be displayed on the display screen may include digital still images, video clips, menu items, and icons. In play mode, the display screen 12 is used as a playback screen for allowing the user to view objects individually or multiple objects at a time. Besides the display screen 12, the hardware user interface also includes a number of keys, buttons or switches for operating the device 10 and for navigating between displayed objects 14. Examples keys include zoom keys (not shown) for zooming a displayed image, a navigation controller 18, and a select key 20. A four-way navigation controller 18 is shown in FIG. 1A, which includes four keys; left/right keys 18a and 18b having a horizontal orientation, and up/down keys 18c and 18d having a vertical orientation. FIG. 1B is a diagram similar to FIG. 1A, where like components have like reference numerals, but shows the conventional imaging device 10 with a two-way navigation controller that only includes two keys 18a and 18b rather than four.

In both embodiments shown in FIGS. 1A and 1B, a user navigates to a desired object 14 by pressing the navigation controller 18. In the case where a single object 14 is displayed on the screen 12, the displayed object 14 is considered the current selection. In the case where multiple objects 14 are displayed, a highlight or other indication is moved from object 14 to object 14 as the user navigates to indicate the currently selected object 14. Once the user navigates to a desired object 14, the user may initiate the default action associated with the current selection by pressing the select key 20. Examples of actions that can be performed by pressing the select key 20 include edit, open/execute, and delete. The select key 20 is shown in the center of the navigation controller 18 in FIG. 1A, but the select key 20 may also be located outside of the navigation controller, as shown in FIG. 1B. In yet other embodiments, the 2-way/4-way navigation controller 18 may be implemented as an integrated 2-way/4-way key.

Although the current solution for allowing a user to navigate among objects and to initiate an action associated with the object 14 using a combination of the navigation controller 18 and the select key 20 works for its intended purposes, this implementation has several disadvantages. First, space for keys is limited on portable imaging devices. Having separate navigation and selection keys 18 and 20 occupies valuable space on the device 10. The user must find and press the right key in the correct sequence, which given the small keys on many portable devices due to miniaturization, is not always an easy task.

In addition, the user must find the right portion of the navigation controller 18 for the direction of navigation desired. Users of devices with navigation controller keys often get unexpected results from pressing an undesired portion of the navigation controller key 18. The most typical error is when the user presses a navigation key when intending to press the selection key 20 to initiate the selection function.

Accordingly, what is needed is an improved method and apparatus for implementing the navigation and select functions on the portable electronic imaging device. The present invention addresses such a need.

BRIEF SUMMARY OF THE INVENTION

The present invention provides a portable electronic imaging device that includes a display screen for displaying objects including any combination of digital still images, video clips, menu items, and icons; and a navigation controller comprising navigation keys for allowing a user to navigate between the displayed objects, wherein the user may select a currently displayed object without moving a finger from a navigation key last pressed, thereby implementing navigation and select functions on a single controller. In the preferred embodiment, the portable imaging device is configured to detect double-presses and press-and-holds on any navigation key, and either or both of these events may be interpreted as a user selection event that invokes the default operation on the currently selected object(s).

According to the method and apparatus disclosed herein, the present invention eliminates the need for a user to use a select key, thus reducing user error. In addition, the select key may be eliminated from the device altogether, thereby saving space on navigation controller-equipped devices.

DETAILED DESCRIPTION OF THE INVENTION

The present invention relates to implementing of navigation and select functions on a portable electronic device. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present inventions provides an improved method and apparatus for implementing navigation and select functions on a portable electronic imaging device by providing a multipurpose navigation controller that performs both navigation and select functions. In a preferred embodiment, the portable electronic device is any device capable of displaying images, such as a digital camera, camera-cell phone, music player, or a PDA. However, in an alternative embodiment, the portable electronic device encompasses devices that control imaging devices, such as a remote control, for example.

Figure 1A:
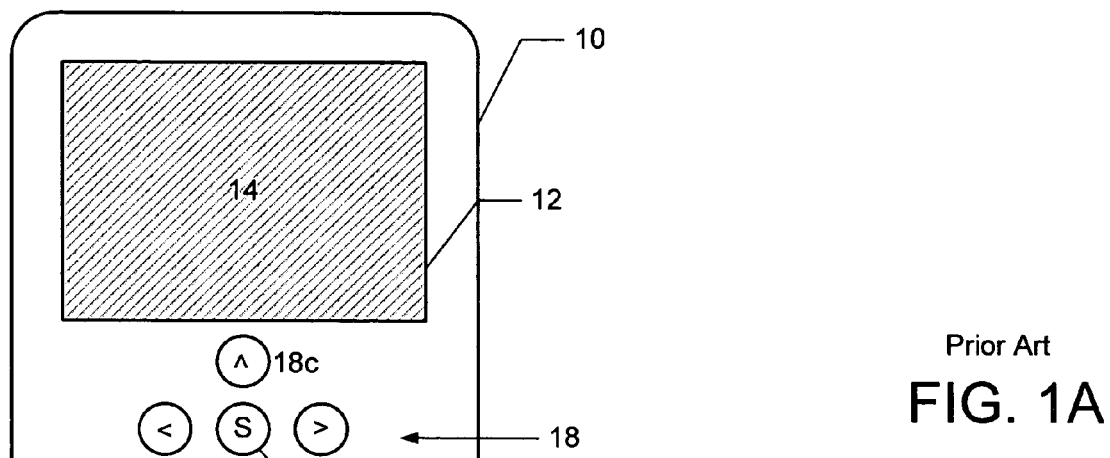
FIGS. 1A and 1B are diagrams illustrating example portions of the hardware interface included on conventional imaging devices.
Figure 1B:
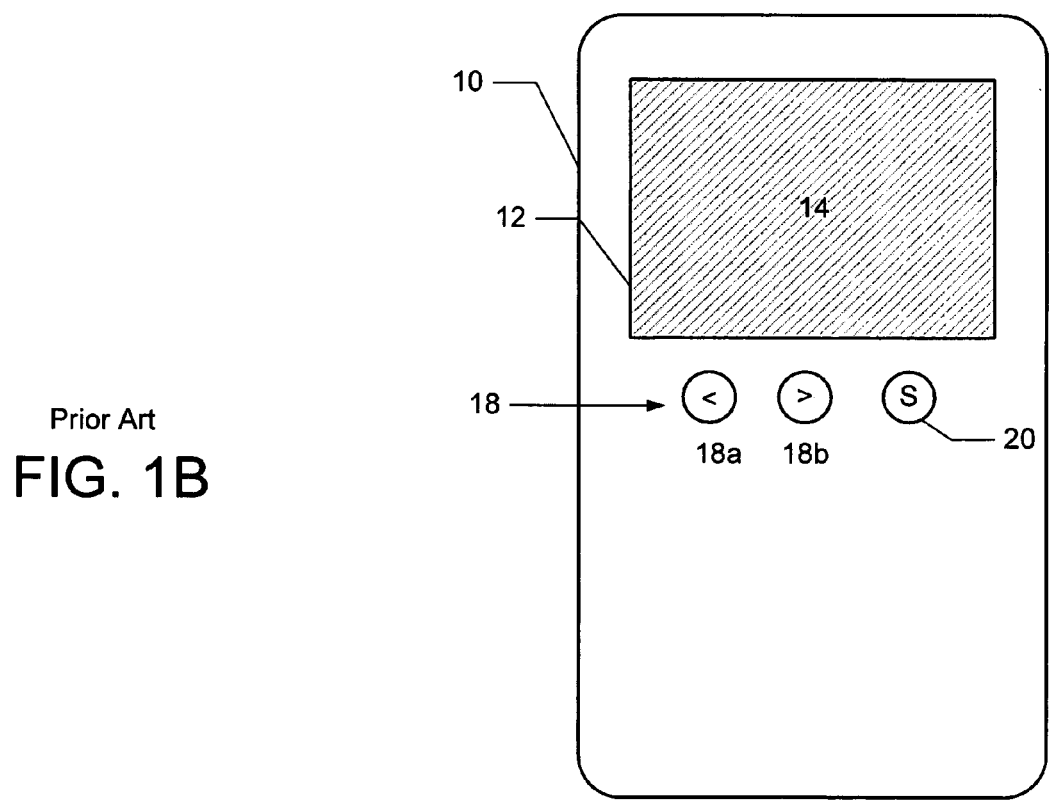
Figure 2A:
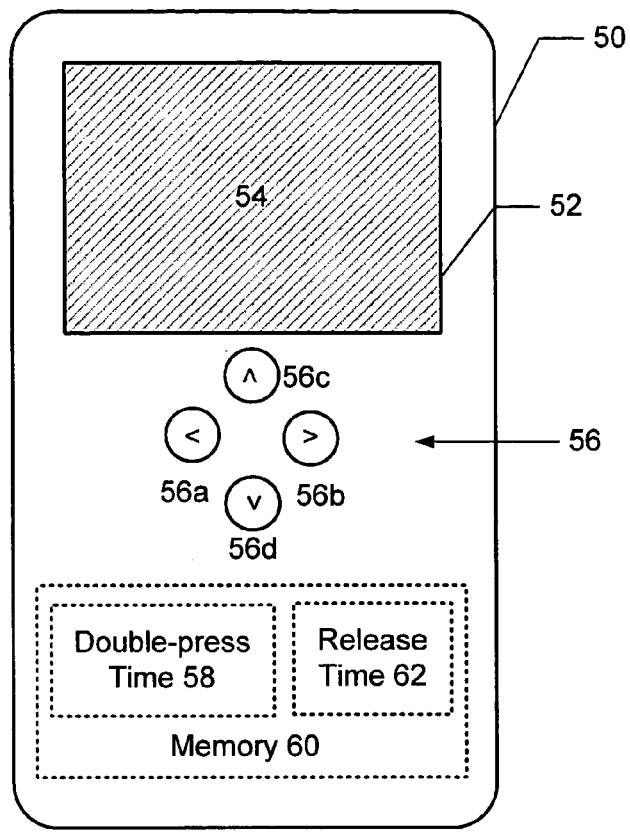
FIGS. 2A and 2B are diagrams illustrating hardware user interface embodiments for a portable electronic imaging device having a multipurpose navigation controller in accordance with the present invention.
Figure 2B:
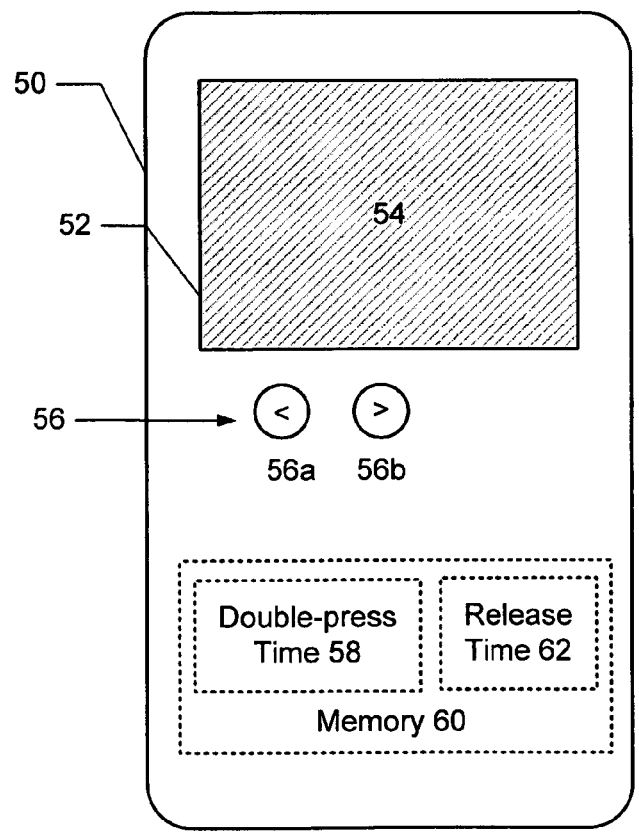

FIGS. 2A and 2B are diagrams illustrating hardware user interface embodiments for a portable electronic imaging device having a multipurpose navigation controller in accordance with the present invention, where like components have like reference numerals. The imaging device 50 equipped with the multipurpose navigation controller 56 of the present invention allows a user to select an object 54 displayed on screen 52 without moving his/her finger from the last navigation key 56 pressed. In the preferred embodiment, the portable imaging device 50 is configured to detect double-presses and press-and-holds on any navigation key 56. Either or both of these events may be interpreted as a user selection event, which when detected invokes the default operation on the currently selected object(s). Thus, when a user navigates to a displayed object 54, he/she can simply double-click the last navigation key 56 pressed (or any navigation key) or press-and-hold the last navigation key 56 pressed to select the current object(s) 54. In a further embodiment, the device 50 may be configured to detect double-presses and press-and-holds on any navigation key 56, such that a detected double-press indicates a user selection, while a detected press-and-hold invokes an action on the currently selected object, and vice versa. With the multipurpose navigation controller 56 of the present invention, no separate selection key is required to indicate a selection event, thus eliminating the need for a separate select key, which potentially saves space on the device and reduces user error.

In a preferred embodiment, the multi-purpose navigation controller 56 may be implemented as either a 4-way or 2-way navigation controller, as shown in FIGS. 2A and 2B, respectively, and the navigation controller 56 may be implemented with separate navigation keys or as an integrated 4-way/2-way key. Also, in the preferred embodiment, a separate select key is eliminated from the device 50 in order to save space. However, an alternative embodiment, the device 50 may include a separate select key (not shown) for user convenience, whether located in the center of the navigation control or apart therefrom.

Figure 3:
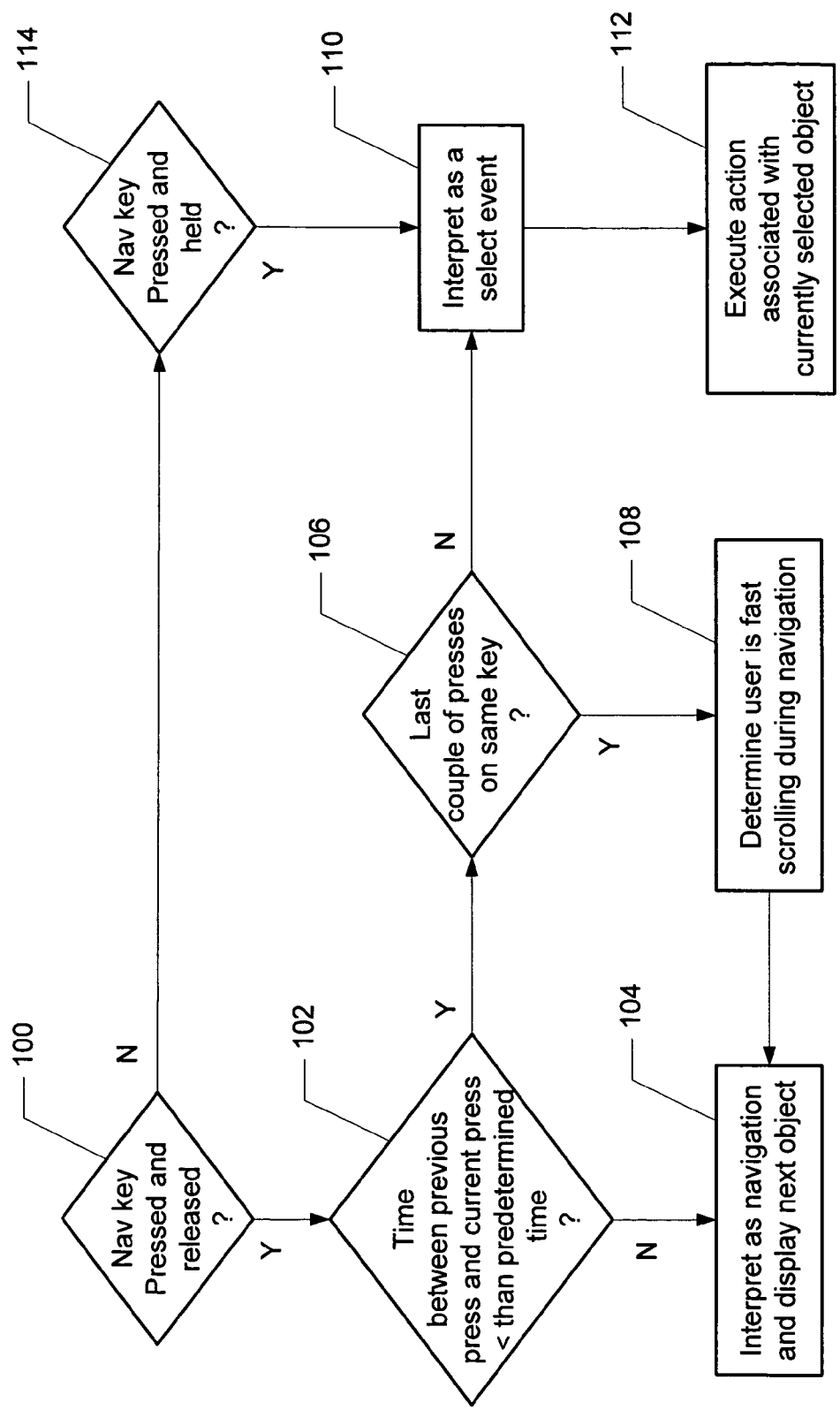
FIG. 3 is a flow diagram illustrating a method for implementing navigation and select functions on a portable electronic imaging device by providing a multipurpose navigation controller in accordance with a preferred embodiment of the present invention.

FIG. 3 is a flow diagram illustrating a method for implementing navigation and select functions on a portable electronic imaging device by providing a multipurpose navigation controller 56 in accordance with a preferred embodiment of the present invention. The process begins when the device 50 detects that one of the navigation keys 56 has been pressed and released in step 100. If so, the device 50 determines if the time between the previous press of the same key and the current presses is less than a stored double-press time in step 102.

Referring again to FIGS. 2A and 2B, the double-press time 58 is preferably stored in a non-volatile memory 60 in the device 50 along with a release time 60. In a preferred embodiment, both are configurable. Referring to FIGS. 2A, 2B, and 3, if the time between presses is greater than the double-press time 58, in step 102, then the device 50 interprets the key press as a navigation event and displays the next object in step 104 (or moves a highlight to the next object, depending on the current operating mode).

According to one aspect of the present invention, the device 50 is further configured to distinguish between fast scrolling during navigation and a double-press as follows. If the time between the previous press of the same key and the current press is less than the stored double-press time 58 in step 102, then the device 50 examines whether the last couple of presses (e.g., three) were performed on the same navigation key 56 in step 106. If the last couple for presses were performed on the same key in step 106, then the device 50 determines that the user is fast-scrolling through displayed objects during navigation in step 108. Accordingly, the current key press is interpreted as a navigation event and the next object is displayed, as described in step 104.

If the time between the previous press of the same key and the current press is less than the stored double-press time 58 in step 102, but the last couple of presses were not performed on the same navigation key in step 106, then the current key press is interpreted as a selection event in step 110. In step 112, the device 50 executes the action associated with the currently selected object.

Also, according to the present invention, if the device 50 detects that one of the navigation keys is pressed, but not released for a time greater than the release time 62 in step 14, then this "press-and-hold" is interpreted as a selection event in step 110, and the device 50 executes the action as described in step 112.

A method and apparatus for implementing the navigation and select functions on the portable electronic imaging device using a multipurpose navigation key has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A portable electronic imaging device, comprising:
   a display screen for displaying objects including any combination of digital still images, video clips, menu items, and icons; and
   a navigation controller comprising navigation keys for allowing a user to navigate between the displayed objects, wherein the device is configured to detect that a navigation key has been pressed, to interpret the current key press as one of a navigation event and a user selection event if a time between previous presses of the same key and the current key press is greater than a predetermined double-press time, and to interpret the current key press as the other of the navigation event and the user selection event if the time between previous presses of the same key and the current key press is less than the double-press time to allow the user to select a currently displayed object without moving a finger from a navigation key last pressed for implementing navigation and select functions on a single key.

2. The device of claim 1 wherein the device is configured to detect a press-and-hold when the current key is pressed, but not released, for a time greater than a release time and to interpret the press-and hold as a user selection event that invokes a default operation on the currently selected object.

3. The device of claim 1 wherein the device distinguishes between fast scrolling during navigation and a double-press by determining if the time between previous presses of the same key and the current key press is greater than the predetermined double-press time, and if so, by examining whether a last plurality of presses were performed on the same navigation key, and if so, then determining that the user is fast-scrolling through displayed objects during navigation.

4. The device of claim 3 wherein if the time between the previous press of the same key and the current press is less than the double-press time, but the last plurality of presses were not performed on the same navigation key, then the device is configured to interpret the current key press as a selection event.

5. The device of claim 1 wherein the device comprises at least one of a digital camera, a camera-enabled cell phone, an MP3 player, and a personal digital assistant.

6. A method for providing a portable electronic imaging device with a multipurpose navigation controller, comprising:
  displaying objects on a display screen, wherein the objects include any combination of digital still images, video clips, menu items, and icons;
  providing the device with a navigation controller comprising navigation keys for allowing a user to navigate between the displayed objects;
  detecting that a navigation key has been pressed;
  interpreting the current key press as one of a navigation event and a user selection event if a time between previous presses of the same key and the current key press is greater than a predetermined double-press time; and
  interpreting the current key press as the other of the navigation event and the user selection event if the time between previous presses of the same key and the current key press is less than the double-press time;
  wherein the device is configured to allow the user to select a currently displayed object without moving a finger from a navigation key last pressed for implementing navigation and select functions on a single key.

7. The method of claim 6 further including:
  detecting a press-and-hold when the current key is pressed, but not released, for a time greater than a release time; and
  interpreting the press-and hold as a user selection event that invokes a default operation on the currently selected object.

8. The method of claim 6 further including: distinguishing between fast scrolling during navigation and a double-press by determining if the time between a previous presses of the same key and the current key press is greater than the predetermined double-press time, and if so, by examining whether a last plurality of presses were performed on the same navigation key, and if so, then determining that the user is fast-scrolling through displayed objects during navigation.

9. The method of claim 8 further including: if the time between the previous press of the same key and the current press is less than the stored double-press time, but the last plurality of presses were not performed on the same navigation key, then interpreting the current key press as a selection event.

10. The method of claim 6 wherein the device includes at least one of a digital camera, a camera-enabled cell phone, an MP3 player, and a personal digital assistant.

\* \* \* \* \*